Patented Jan. 15, 1935

1,987,747

UNITED STATES PATENT OFFICE 1,987,747

DYESTUFFS OF THE ANTHRAQUINONE SERIES

Paul Nawiasky and Otto Grosskinsky, Ludwigshafen-on-the-Rhine, Germany, assignors to General Aniline Works, Inc., New York, N. Y., a corporation of Delaware No Drawing. Application May 25, 1934, Serial No. 727,589. In Germany January 25, 1933

12 Claims. (Cl. 260—60)

The present invention relates to new dyestuffs of the anthraquinone series and a process of producing same.

We have found that derivatives of alpha-aminoanthraquinones which have an acetyl group in the nucleus and at least one sulphonic acid group in the nucleus and/or in substituents are very valuable dyestuffs. The preparation of the said compounds may be effected in different ways and the initial materials may be anthraquinone derivatives which contain no alpha-amino groups, the latter being subsequently introduced. The alpha-amino groups may be substituted in any desired manner, and in addition to an alpha-amino group, there may be present in the final products other substituted or unsubstituted alpha- or beta-amino groups.

The said anthraquinone derivatives may be prepared by subjecting alpha-aminoanthraquinones containing an acetyl group in the nucleus to sulphonation, or by causing alpha-halogen-anthraquinones containing an acetyl group in the nucleus to react with amines containing a sulphonic acid group, as for example sulphanilic acid, a substituted amino group and a sulphonic group thus being introduced simultaneously into the molecule. A further method of producing the said anthraquinone derivatives consists in introducing into acetyl-anthraquinone, or its substitution product containing a sulphonic acid group, one or more amino groups or substituted amino groups at least one in an alpha-position by customary methods. For example, acetylanthraquinone sulphonic acids may be nitrated by means of nitric acid and the product reduced, one or both hydrogen atoms in one or several amino groups then being replaced by alkyl or aryl radicles. The same products may also be obtained by halogenation of acetyl-anthraquinones containing a sulphonic acid group and then replacing all or part of the halogen atoms by amino or substituted amino groups by the action of ammonia or amines. Acetylanthraquinones may also be sulphonated and then subsequently one or more amino groups or substituted amino groups may be introduced by customary methods, at least one being in the alpha-position. In addition to the said substituents, the dyestuffs according to this invention may also contain other substituents, as for example hydroxy, alkoxy, alkyl, arylido, cyclohexylamino, or also amino groups, or nitro groups which may be substituted or halogen atoms.

Initial materials which by subsequent sulphonation may be converted into the compounds defined at the top of the present specification are obtained for example in the following manner: 2-ethylanthraquinone is nitrated whereby 1-nitro-2-ethylanthraquinone is obtained. By treatment with fuming sulphuric acid and subsequent reduction as described in the U. S. Patent No. 1,830,152 1-amino-2-acetylanthraquinone is formed. By the action of sulphuryl chloride 1-amino-2-acetyl-4-chlor-anthraquinone is formed. By boiling the latter in the presence of sodium acetate and cupric acetate in an excess of an arylamine finally aryl substituted acetyl derivatives of anthraquinone are obtained which are suitable initial materials for preparing the valuable compounds defined above by sulphonation.

In nearly all cases at first intermediary products are obtained which correspond to the general formula

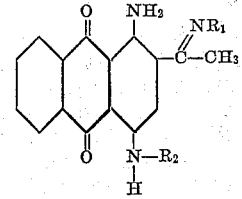

in which $R_1$ and $R_2$ stand for an aryl radicle such as phenyl, meta-methyl-phenyl or naphthyl. By treating the thus obtained compounds with diluted sulphuric acid or diluted acetic acid, the substituent in 2-position

is converted into the free acetyl group one molecular proportion of the arylamine used being recovered. By treating these intermediary products with sulphonating agents this conversion into the compound containing the free acetyl group and the sulphonic acid group may be effected at once.

By introducing two nitro groups into beta-ethylanthraquinone 1,5-dinitro-2-ethylanthraquinone is prepared which by treatment with fuming sulphuric acid and reduction is converted into 5-nitro-1-amino-2-acetylanthraquinone. By reduction and/or chlorination further materials can be obtained which by sulphonation can be converted into alpha-amino-acetylanthraquinone sulphonic acids or substitution products thereof.

Initial materials containing several amino groups may be obtained by starting with 1,4-dichlor-5-ethylanthraquinone (which can be prepared by condensing 3,6-dichlorphthalic acid with ethylbenzene). Another way of preparing acetylanthraquinones which may serve as starting materials consists in treating anthracene with acetyl chloride whereby 2-acetylanthracene is formed which by oxidation is converted into 2-acetylanthraquinone into which the further groups desired may be introduced in analogous manner as described above. The sulphonation may be carried out by means of the well known sulphonating agents at temperatures between 0° and 100° C., for example with concentrated sulphuric acid or oleum, preferably in the presence of a substance which renders the sulphonation more uniform, such as boric acid, formaldehyde and the like.

According to this invention dyestuffs may be obtained which may be employed for a great variety of purposes, as for example as acid dyestuffs for wool and silk. Very valuable are those dyestuffs which contain at least two unsubstituted or substituted amino groups in para-position to one another.

The following examples will further illustrate how the said invention may be carried out in practice but the invention is not restricted to these examples. The parts are by weight.

Example 1

4 parts of anhydrous boric acid are introduced within ¼ hour into 190 parts of sulphuric acid monohydrate at 50° C. The whole is cooled to 35° C. and 14 parts of 1,4-diamino-2-acetylanthraquinone

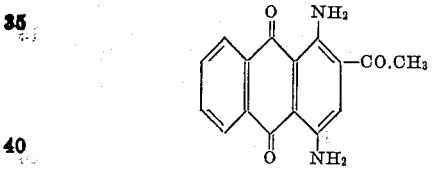

(obtainable from 1-amino-2-acetylanthraquinone by chlorination and replacement of the chlorine by an amino group) are introduced. The deep blue solution is stirred for an hour at 35° C. 20 parts of 70 per cent oleum are allowed to flow in and the temperature is raised to 65° C. the whole being stirred at this temperature until water-insoluble initial material is no longer present. The reaction mixture is then allowed to flow into ice-cold water, some sodium bisulphite added, the whole warmed to about 80° C., sodium chloride added until saturated and worked up in the usual manner. The resulting dyestuff dyes wool pure blue shades from an acid bath.

Example 2

14 parts of 1,4-diamino-2-acetylanthraquinone are introduced at 20° C. into 190 parts of sulphuric acid monohydrate; when all has been introduced the whole is stirred for about an hour at the same temperature. 20 parts of 70 per cent oleum are added and the whole kept at room temperature until unchanged initial material can no longer be detected. It is then worked up as described in Example 1. The sulphonic acid obtained dyes wool similarly to the product obtained according to Example 1.

Example 3

14 parts of the conversion product of 1-amino-2-acetyl-4-chloranthraquinone with para-toluidine (prepared from the said compounds in the presence of sodium acetate and copper acetate) are introduced at 40° C. into a solution of 4 parts of anhydrous boric acid in 280 parts of sulphuric acid monohydrate, the whole being stirred at 40° C. until all is dissolved. 15 parts of 70 per cent oleum are then added and the whole heated at 75° C. until the sulphonation is completed. The reaction mixture is then poured into 10 times the amount of ice-cold water, the whole heated to 80° C. after the addition of some sodium bisulphite, and sodium chloride is then added to precipitate the sodium salt of the sulphonic acid. It dyes animal fibres clear bluish green shades.

Example 4

9.25 parts of the conversion product of para-toluidine with 1-amino-2-acetyl-4-chloranthraquinone are introduced at 15° C. while stirring into 100 parts of sulphuric acid monohydrate, the whole being stirred for an hour at about 15° C. After adding 10 parts of 70 per cent oleum, the whole is stirred at 15° C. until the sulphonation is completed. The reaction mixture is allowed to run into ice-cold water and is worked up in the usual manner, a green sodium salt being finally obtained in a good yield. The dyestuff dyes wool similarly to the dyestuff obtained according to Example 3 using boric acid.

Example 5

10 parts of the conversion product of 1-amino-2-acetyl-4-chloranthraquinone with meta-toluidine are introduced at 15° C. into 150 parts of sulphuric acid monohydrate and the whole stirred at the said temperature until all is dissolved. 16 parts of 70 per cent oleum are added and stirring continued at 15° C. until the sulphonation is completed. The reaction mixture is poured into ice-cold water, boiled, preferably with an addition of a little bisulphite, and the difficultly soluble sulphonic acid sodium salt filtered off by suction after adding common salt. The said sodium salt dyes wool blue-green shades.

Example 6

10 parts of the conversion product of 1-amino-2-acetyl-4-chloranthraquinone with aniline are introduced into 150 parts of sulphuric acid monohydrate at 15° C. the mixture being stirred at the said temperature until all is dissolved. 14 parts of 70 per cent oleum are then added and the reaction mixture is kept at the said temperature, while stirring, until the sulphonation is completed. The dyestuff obtained on working up the reaction mixture in the usual manner dyes wool greenish blue shades.

Example 7

10 parts of the conversion product of 1-amino-2-acetyl-4-chloranthraquinone with para-anisidine are introduced at 15° C. into 150 parts of sulphuric acid monohydrate, the mixture being stirred at the said temperature until all is dissolved. 16 parts of 70 per cent oleum are then added, stirring being continued until the sulphonation is completed. The reaction mixture is then poured into ice-cold water, the whole boiled after the addition of some sodium bisulphite and saturated with sodium chloride. On working up the reaction mixture a dyestuff is obtained dyeing wool bluish green shades.

Example 8

A mixture of 10 parts of 1-amino-2-acetyl-4-bromanthraquinone, 10 parts of dry potassium acetate and 1 part of copper acetate is introduced into a mixture of 15 parts of para-phenylene diamine and 100 parts of pyridine. The reaction mixture is then boiled under reflux until the color undergoes no further change. The 1-amino-2-acetyl-4-para-aminoanilido-anthra-quinone thus obtained is recrystallized from pyridine.

10 parts of the said product are dissolved in 200 parts of sulphuric acid monohydrate and then 15 parts of 23 per cent oleum are added at a temperature of 15° C. in the course of half an hour, while stirring. When the sulphonation is completed, the whole is poured onto ice. The separated blue crystals are filtered off and washed with dilute sulphuric acid. The sulphonic acid thus obtained is dissolved in hot water and the sodium salt precipitated by the addition of sodium chloride. It dyes wool green shades.

*Example 9*

A mixture of 34 parts of 1-amino-2-acetyl-4-bromanthraquinone, 35 parts of metanilic acid, 25 parts of potassium acetate, 0.06 part of copper acetate and 200 parts of water is heated under pressure at 160° C. until unchanged initial material can no longer be detected. The whole is filtered and the filtrate inspissated. The separated salt of the sulphonic acid is filtered off, washed with a solution of sodium chloride and dried. It dyes wool blue shades.

*Example 10*

15 parts of 1-amino-2-acetyl-4-bromanthraquinone are dissolved in 300 parts of sulphuric acid monohydrate at 35° C. and then 26 parts of 23 per cent oleum are slowly added, while stirring. After completion of the sulphonation, the sulphonic acid is separated in the form of its sodium salt.

A mixture of 9 parts of the said sodium salt, 400 parts of water, 4 parts of potassium acetate, 5 parts of para-toluidine and 0.1 part of cuprous chloride is heated at between 80° and 90° C. while stirring and excluding the access of air until a change in the coloration of the solution can no longer be observed. The excess of para-toluidine is distilled off with steam, and the solution then saturated with sodium chloride whereby the crude product is precipitated which is filtered off. It is then dissolved in a large amount of methanol, while boiling, the solution filtered and the filtrate inspissated. The crude dyestuff is purified by redissolving it in sulphuric acid and converted into the sodium salt in the usual manner. The green dyestuff powder dyes wool blue-green shades.

If instead of para-toluidine aniline or meta-toluidine is employed, the corresponding dyestuffs are obtained.

What we claim is:—

1. Alpha-aminoanthraquinones corresponding to the general formula

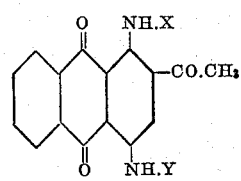

in which X and Y stand for hydrogen, alkyl or aryl and which contain at least one sulphonic acid group in the molecule.

2. Alpha-aminoanthraquinones corresponding to the general formula

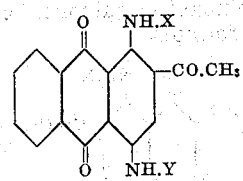

in which X and Y stand for hydrogen, alkyl or aryl and which contain at least one sulphonic acid group in the anthraquinone nucleus.

3. Alpha-aminoanthraquinones corresponding to the general formula

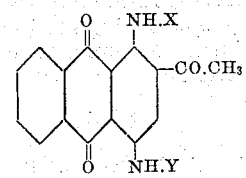

in which at least either X or Y stands for alkyl or aryl and which contain at least one sulphonic acid group in one of the substituents.

4. Alpha-aminoanthraquinones corresponding to the general formula

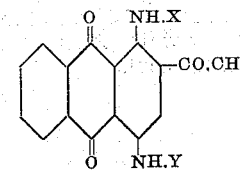

in which X or Y stands for aryl and which contain at least one sulphonic acid group in the molecule.

5. Alpha-aminoanthraquinones corresponding to the general formula

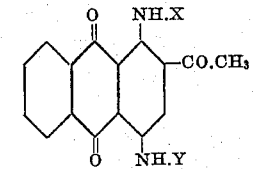

in which X stands for hydrogen and Y for aryl and which contain at least one sulphonic acid group in the molecule.

6. Alpha-aminoanthraquinones corresponding to the general formula

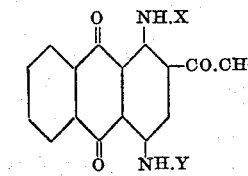

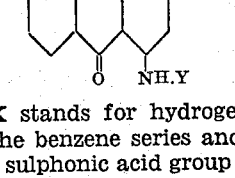

in which X stands for hydrogen and Y for a radicle of the benzene series and which contain at least one sulphonic acid group in the molecule.

7. Alpha-aminoanthraquinones corresponding to the general formula

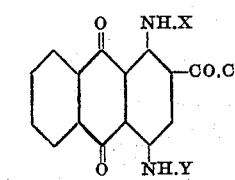

in which X stands for hydrogen and Y for a radicle of the benzene series containing a methyl group in the para-position and which contain at least one sulphonic acid group in the molecule.

8. Alpha-aminoanthraquinones corresponding to the general formula

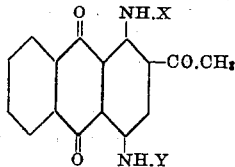

in which X stands for hydrogen and Y for a radicle of the benzene series containing a methyl group in the meta-position and which contain at least one sulphonic acid group in the molecule.

9. Alpha-aminoanthraquinones corresponding to the general formula

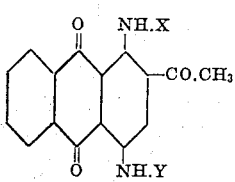

in which X stands for hydrogen and Y for a radicle of the benzene series containing an amino group and which contain at least one sulphonic acid group in the molecule.

10. Alpha-aminoanthraquinones corresponding to the general formula

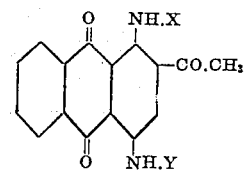

in which X stands for hydrogen and Y for a radicle of the benzene series containing an amino group in the para-position and which contain at least one sulphonic acid group in the molecule.

11. The process of producing alpha-aminoanthraquinones containing an acetyl group in the nucleus and at least one sulphonic acid group in the molecule which comprises causing 1-aminoanthraquinones containing an acetyl group in the nucleus and a halogen atom in 4-position to react with a sulphonated aromatic amine.

12. The process of producing alpha-aminoanthraquinones containing an acetyl group in the nucleus and at least one sulphonic acid group in the molecule which comprises causing 1-aminoanthraquinones containing an acetyl group and at least one sulphonic acid group in the nucleus and a halogen atom in 4-position with an aromatic amine.

PAUL NAWIASKY.
OTTO GROSSKINSKY.